Oct. 21, 1969      J. J. FRY      3,473,397

ACTUATORS

Filed Feb. 23, 1967      3 Sheets-Sheet 1

INVENTOR
JEREMY JOSEPH FRY

BY Stevens, Davis, Miller & Mosher
ATTORNEYS

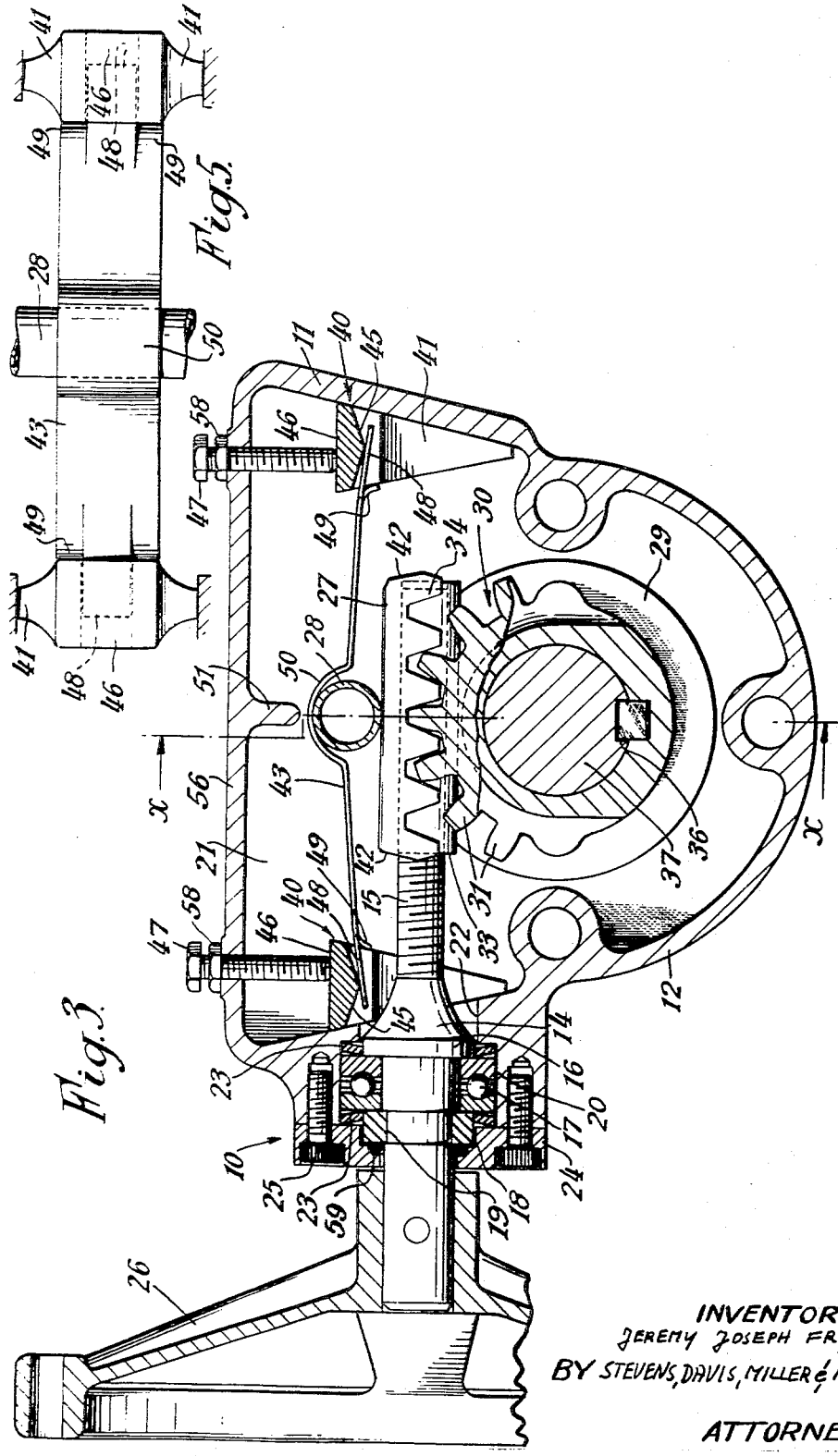

Oct. 21, 1969   J. J. FRY   3,473,397
ACTUATORS
Filed Feb. 23, 1967   3 Sheets-Sheet 3
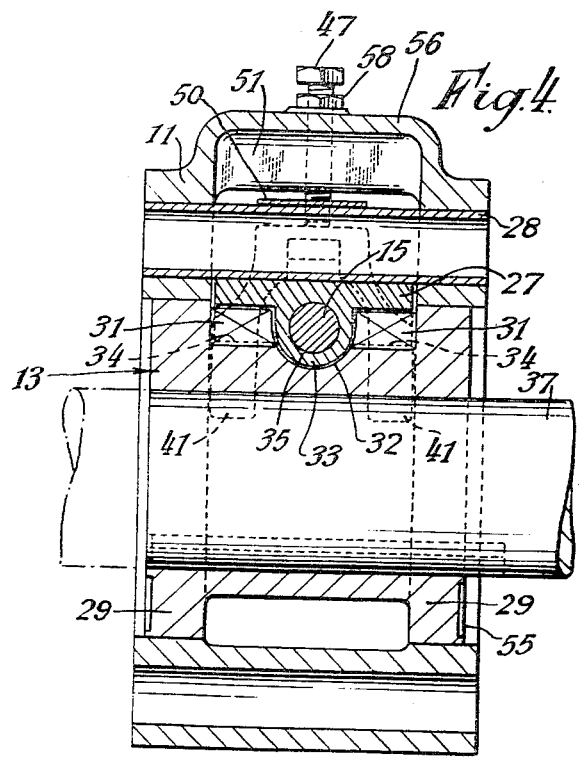
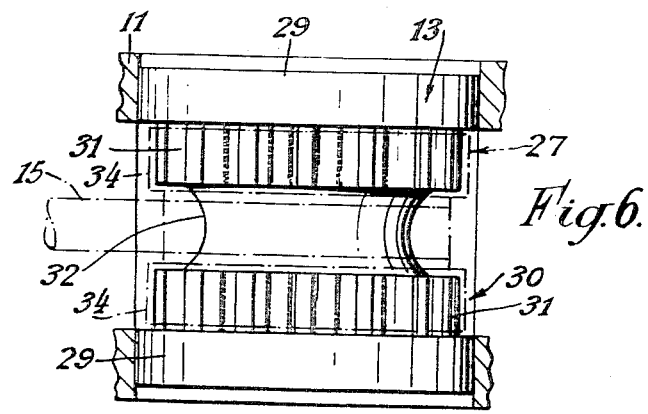
INVENTOR
JEREMY JOSEPH FRY
BY
Stevens, Davis, Miller & Mosher
ATTORNEYS

United States Patent Office 3,473,397
Patented Oct. 21, 1969

3,473,397
ACTUATORS
Jeremy J. Fry, Bath, Somerset, England, assignor to Rotork Engineering Company Limited, Bath, Somerset, England
Filed Feb. 23, 1967, Ser. No. 618,220
Claims priority, application Great Britain, Feb. 25, 1966, 8,482/66
Int. Cl. F16h 1/12, 29/02
U.S. Cl. 74—89.15                                     10 Claims

ABSTRACT OF THE DISCLOSURE

A small self-contained actuator includes a rotatable input spindle which extends into the casing of the actuator and is threadably connected with a rack mounted for linear movement and restrained against rotation. The teeth of the rack engage with the teeth of a pinion mounted on a rotatable output member extending transversely of the casing. Rotation of the output member is controlled by adjustable end stops engaged by the rack.

---

This invention relates to actuators and has for its object to provide a small, self-contained apparatus which may be operated manually or by power means to produce a predetermined angular movement of an output member for operating a semi-rotary valve or like member.

A further object of the invention is the provision of an actuator construction which enables the valve or other actuated member to be mounted at either end or side of the output member so as to provide a clockwise or anti-clockwise output for the same direction of operation of the input handwheel or motor.

A still further object of the invention is to provide an actuator in which the mechanism has a high reduction ratio without reducing the strength of the components thus allowing the use of a low input torque while ensuring that the mechanism is irreversible.

In its broadest aspect the invention provides an actuator for operating a semi-rotary valve or like device, said actuator comprising a casing, a rotatable input member extending into said casing and generally restrained against axial movement, actuating means for said input member for rotating said member in one or other direction, a rack member threadably mounted on a screw-threaded portion of said input member in said casing, said rack member being restrained against rotational movement so as to move linearly in one or other direction in response to rotational movement of said input member, and an output member having a pinion thereon meshing with said rack member in said casing whereby said output member is rotatable in response to the linear movement of said rack member.

In the preferred embodiment of the invention the output member comprises a sleeve which extends transversely of the casing and is adapted to receive a valve spindle or like member from either side of the actuator casing. This enables the valve spindle to be fitted on either side of the casing to give a clockwise or anti-clockwise output for a particular direction of rotation of the actuating means.

The input member preferably comprises a spindle having a thrust bearing mounted thereon. The thrust bearing projects into a groove or housing in the casing of the actuator and engages the side walls of the groove through the intermediary of spring means so that the spindle is resiliently mounted to cushion shock loads applied thereto. The arrangement also allows the spindle to take up its natural position when threaded into the rack member and thus obviates any necessity for extreme accuracy in relatively positioning the spindle and rack member.

The rack member is engageable in each direction of travel with an end stop, which end stops are adjustable so as to provide a predetermined rotation of the output member. Each end stop is wedge-shaped and is located against a stationary surface, preferably the wall of the casing. The end stop may be adjusted towards or away from the longitudinal axis of the rack member. the end stops are held in position against the end walls by a spring member which additionally urges the stop members in a direction away from the longitudinal axis of the rack member, the stop members being movable in the other direction towards the longitudinal axis of the rack member by screws adjustably mounted in a wall of the casing.

The pinion on the output member preferably comprises two sets of teeth spaced from each other so as to receive the rack member slidably therebetween. The rack member is formed with two sets of teeth positioned one at each side of the screw threaded portion of the input member, each set of teeth drivably engaging a set of teeth of the pinion.

In order that the invention may be clearly understood the preferred embodiment will now be described by way of example with reference to the accompanying drawings, in which:

FIGURE 3 is a longitudinal section through the actuator as shown in FIGURE 1;

FIGURE 4 is a section taken on the line X—X of FIGURE 3;

FIGURE 5 is a plan view of the end stops for the rack member together with the associated spring; and FIGURE 6 is a plan view of the output member or sleeve showing in particular the construction and location of the two sets of teeth of the pinion thereon.

Figure 1:
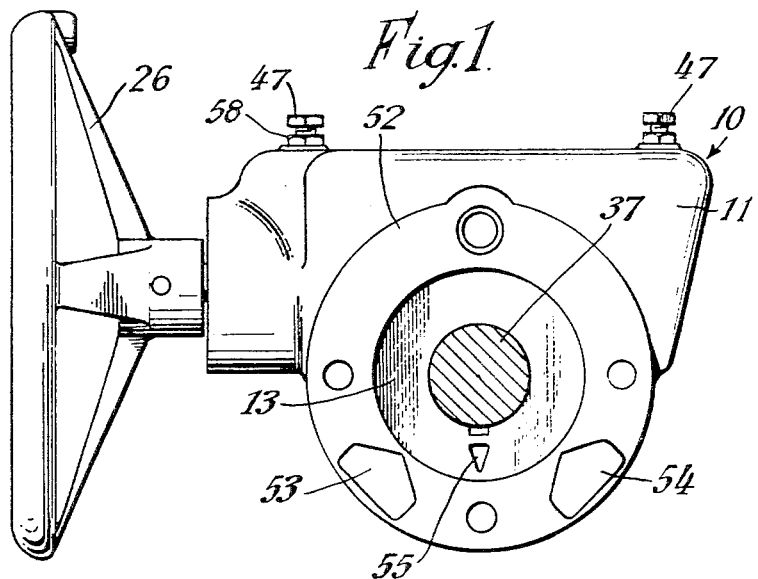
FIGURE 1 is a side elevation of the actuator in accordance with the invention.
Figure 2:
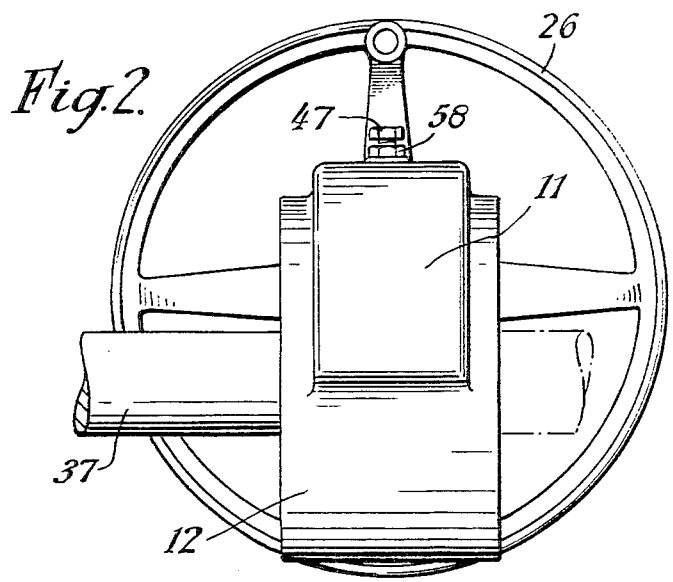
FIGURE 2 is a rear elevation of the actuator as shown in FIGURE 1.

Referring now to the drawings and in particular to FIGURES 1 and 2 it will be seen that the actuator 10 comprises a relatively narrow casing 11 as shown more clearly in FIGURE 2. The central part 12 of the casing is wider than the main body of the casing and provides support for an output member 13 which is journalled therein and which extends transversely the length of the casing 11.

The actuator 10 is shown in greater detail in the sectional views of FIGURES 3 and 4 and it will be seen that the input member comprises a spindle 14 which extends into the casing 11 at one side thereof. The spindle 14 is formed with a screw threaded portion 15 at its inner end within the casing 11 and adjacent the screw threaded portion 15 it is formed with an abutment face 16 which provides a support for one side of a thrust bearing shown generally by the reference numeral 17. The thrust bearing 17 is restrained in the other axial direction by a bearing ring 18 which is located in a groove 19 in the periphery of the spindle 14. The bearing ring 18 is formed with a gap in its periphery and it is then crimped into the groove 19.

The spindle 14 with the thrust bearing 17 mounted thereon is positioned in the casing 11 of the actuator as shown in FIGURE 3 of the drawings with the thrust bearing located in a groove or housing 20 which communicates with the interior 21 of the casing through a short passageway 22. A disc spring 23 is located on each side of the bearing 17, the springs fitting over the outside diameter of the abutment face 16 and the bearing ring 18. The input spindle 14 is held in place in the housing 20 of the casing 11 by means of an end plate 24 which is attached to the casing by means of a number of screws 25 and sealed with an O-ring 59.

The arrangement for the input spindle 14 as described above permits rotational movement of the spindle in one or other direction but generally the spindle is restrained against axal movement. The mounting of the thrust bearing 17 by means of the disc springs 23 does, however, provide a resilient mounting for the spindle as the springs act as shock absorbers to cushion the effect of any shock loads on the spindle caused when the rack member associated therewith reaches the end stops as will be hereinafter described. The resilient mounting also enables the spindle 14 to take up its natural position when connected with the rack member and it thus obviates any necessity for extreme accuracy in the relative positioning of the spindle 14 with the rack member. The rotational movement of the spindle 14 is preferably effected by means of a handwheel shown by the reference 26 which is connected to the spindle in any suitable way. It will, however, be understood that the spindle 14 can be rotated by motor means if desired such as a reversible electric motor.

As previously mentioned the input spindle 14 is connected at its screw-threaded end portion 15 with a rack member which is shown by the reference numeral 27. As shown in FIGURE 4 of the drawings the rack 27 extends substantially across the width of the casing 11 and it has a flat upper portion which is engaged by a bush 28 which extends across the casing and is fitted into the side walls. The bush 28 engages the rack 27 so as to hold it in mesh with a pinion formed on the output member 13.

The output member 13 is formed with two bearings 29 located in the side walls of the casing as shown in FIGURE 4 of the drawings. The output member 13 is also formed with a pinion 30 having two sets of teeth 31 as shown more clearly in FIGURES 4 and 6 of the drawings. The two sets of teeth 31 extend partially around the circumference of the output member 13 (see FIGURE 3) and are spaced from each other axially along the output member 13 so as to provide a central portion 32 therebetween in which the body portion 33 of the rack 27 is slidably mounted as shown in FIGURE 4. The rack 27 is also provided with two sets of teeth 34 one on each side of the body portion 33 to mesh with the two sets of teeth 31 of the pinion 30 and the body portion 33 of the rack 27 is provided with a central bore 35 which is threaded for receiving the screw threaded end portion 15 of the spindle 14. The rack 27 positions the output member 13 in the casing 11 because the two sets of teeth 31 of the pinion 30 are formed below the diameter of the adjacent bearings 29 so that the rack locates between the bearings.

It will be appreciated that as the input spindle 14 is rotated by the handwheel 16 the rack 27 by reason of its threaded engagement with the spindle moves axially in the casing 11 and in so doing it causes the pinion 30 to rotate in one or other direction. The output member 13 on which the pinion 30 is formed is provided with a keyway 36 so that a valve spindle or other member can be connected therein for rotation with the output member. The valve spindle 37 can be fitted from either side of the casing 11 and this is a feature of the actuator as it provides for the alternative mounting of the spindle 37 to provide for clockwise or anti-clockwise movement of the valve spindle for a predetermined rotation of the handwheel 26.

An important feature of the design of the actuator is the provision of end stops which allow a controlled adjustable rotary movement of the spindle 37 between fixed limits. The end stops operate on the input members of the actuator rather than on the output member as in conventional known actuators.

The casing 11 of the actuator contains two adjustable end stops 40 which are of an identical construction and which are made of brass. The end stops 40 are shown in plan in FIGURE 5 of the drawings and in section in FIGURE 3. An end view of the end stops is shown in dotted lines in FIGURE 4 of the drawings and it will be seen that in this elevation the end stops are substantially U-shaped and that they fit with the lower part of the limbs 41 of the stop against the side walls of the casing. One of the end stops 40 straddles the input spindle 14 while the other end stop is located at the other side of the casing. The side limbs of the end stops are wedge-shaped in section as shown in FIGURE 3 and the stops are capable of being moved along the stationary surface or casing walls 11. The surfaces of the end stop 40 and the stationary surface define a plane of engagement consisting of all points of engagement between the end stop and the stationary surface. This plane of engagement may be a curved surface but is preferably a flat surface. The position of the end stop may be varied relative to the end surface 42 of the rack 27 by moving them towards or away from the longitudinal axis of the rack 27.

The stops 40 are positioned for engagement by the end surfaces 42 of the rack 27, thus defining a plane of engagement between the surface of the end stop and the surface of the rack. This plane of engagement consists of all points of engagement between the end stop and the rack and may be a curved surface. In the preferred embodiment, the surfaces of the end stop and rack are designed to lie in flat parallel planes so as to minimize wear or indentation of the working areas.

The end stops are held in position against the side walls of the casing 11 by means of a spring 43. The spring 43 has end portions 48 which engage within the end stops between the limbs 41 and act against the inner surface 45 of the top portion 46 of the stop members. The spring 43 is such that the two arms will deflect to a substantially horizontal position, over the bush 28 as in FIGURE 3, and consequently the ends 48 of the spring resiliently act to urge the end stops upwardly against screws 47 adjustably mounted in threaded bores in the top wall 56 of the casing. Each screw 47 is provided with a lock nut 58 which enables the screw to be adjusted and then locked into position to hold the end stops in a predetermined position in the casing walls. As previously mentioned the spring 43 holds the stop members against the walls and this is obtained by means of the lugs 49 formed on the ends of the spring surface and which engage against the limbs 41 of each of the end stops.

The spring 43 is provided with a bowed central portion 50 which is located around the bush 28. In addition the casing is provided with an extension 51 which extends downwardly from its top wall 56 closely adjacent the central portion 50 of the spring 43 so as to prevent the spring from moving out of position.

The arrangement of the end stops 40 as described above has the advantage of greatly reducing the load the components must withstand in view of the fact that the rotational movement of the output spindle is controlled by the engagement of an input member with the end stops. The adjustment of the movement is easily obtained externally of the casing by rotation of the screws 47 and these are independently operable to vary the open and closed positions of the associated valve.

As shown in FIGURE 1 of the drawings the casing is completed by means of side rings 52 attached to the casing 11 and which are provided with plates 53, 54 showing the open and closed positions of the valve. In this connection the output member 13 is provided with an indicator arrow 55 for co-operation with the positioning plates 53, 54.

The actuator arrangement as described above provides a simple and cheap construction in which the mechanism has a high reduction ratio without reducing the strength of the components. The high reduction ratio permits a low input torque and also ensures that the mechanism is irreversible.

I claim:

1. In an actuator arrangement for operating a semi-rotary valve or like device, said actuator of the type comprising an input member mounted for rotation, said input member being generally restrained against axial movement, a rack member threadably mounted on a screw-threaded portion of the input member, said rack member being restrained against rotational movement so as to move along the input member in response to rotational movement of said input member and an output member having a pinion thereon meshing with said rack member, whereby the output member is rotatable in response to the movement of the rack member wherein the improvement comprises an end stop member on either side of the rack member, said end stop member positioned to engage said rack member, so as to define the extent of movement of the rack member in either direction, said end stop member being adjustable to provide a predetermined rotation of the output member in at least one direction of rotation of said output member.

2. An actuator as claimed in claim 1, in which the output member comprises a sleeve adapted to receive a valve spindle or like member from either side of the output member depending on the output direction required for a particular direction of rotation of the input member.

3. An actuator as claimed in claim 1, wherein the actuator is contained in a casing and wherein the input member comprises a spindle having a thrust bearing mounted thereon, said thrust bearing projecting into a groove or housing in said casing and engaging the side walls of said groove through the intermediary of spring means whereby said spindle is resiliently mounted to cushion shock loads applied thereto.

4. An actuator as claimed in claim 1, wherein the pinion on the output member comprises two sets of teeth spaced to receive the rack member slidably therebetween, said rack member having two sets of teeth positioned one at each side of the screw-threaded portion of the input member, each set of teeth of the rack engaging a set of teeth of the pinion.

5. An actuator as claimed in claim 1, wherein the end stop member is adjustable across the path of movement of the rack member and presents an engageable surface which is angled with respect to said path of movement so that adjustment of the end stop member is effective to vary the end position of movement of the rack member.

6. An actuator as claimed in claim 1, wherein the end stop member moves along a stationary member, the plane of engagement between said end stop member and said stationary member being angularly disposed to the plane of engagement between said end stop member and said rack member so that the planes are non-parallel.

7. An actuator as claimed in claim 6, wherein the end stop member is urged along the stationary member by resilient means while under the control of adjustment means.

8. An adjustable end stop arrangement comprising the combination of a movable member being movable along a predetermined path and an end stop member having an engageable surface and being positioned to be engaged by said movable member to define an end position of movement for said movable member, the surface of contact on said movable member being fixed thereon and reciprocating therewith, wherein said end stop member is adjustable across the path of movement of the movable member and wherein the engageable surface of the end stop member is angled with respect to the path of movement of the movable member so that adjustment of the end stop member is effective to vary the end position of movement of the movable member in at least one direction.

9. An adjustable end stop arrangement as claimed in claim 8, wherein the end stop member is slidably supported by a stationary member, said stationary member being angled with respect to the path of movement of said movable member.

10. An adjustable end stop arrangement as claimed in claim 9, wherein the end stop member is urged along the stationary member by resilient means while under the control of adjustment means.

References Cited

UNITED STATES PATENTS

| 2,226,038 | 12/1940 | Westcott et al. | 74—499 |
| 2,833,510 | 5/1958 | Allen et al. | 251—250 XR |
| 3,011,462 | 5/1961 | Ritter et al. | 74—526 |

FRED C. MATTERN, JR., Primary Examiner

F. D. SHOEMAKER, Assistant Examiner

U.S. Cl. X.R.

74—89.17, 424.8; 251—250